Patented July 25, 1944

2,354,492

UNITED STATES PATENT OFFICE 2,354,492

MARIHUANA ACTIVE COMPOUND

Roger Adams, Urbana, Ill.

No Drawing. Application November 26, 1941,
Serial No. 420,528

9 Claims. (Cl. 260—333)

The present invention relates to pharmacological pyran compounds characterized by marihuana activity. These compounds may be represented by the following general formula:

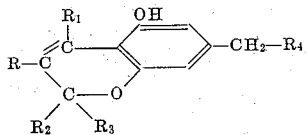

in which R represents hydrogen or an alkyl or alkenyl group; $R_1$, $R_2$ and $R_3$ represent lower alkyl groups and $R_4$ represents an alkyl group containing 1 to 10 carbon atoms.

The object of the present invention is to provide pharmacological products and processes of preparing the same. The following examples will serve to illustrate the present invention.

Example I (a) *4-methyl-5-hydroxy-7-n-amylcoumarin*

This product may be prepared by refluxing for about four hours a solution made up of about 4.5 grams of 1,3-dihydroxy-5-n-amylbenzene (olivetol), 4.5 grams of ethyl acetoacetate and 3.4 grams of phosphorus oxychloride in about 75 cc. of dry benzene. Water is then added, the reaction mixture cooled and the crystals formed therein separated by filtration. Evaporation of the benzene layer of the filtrate yields an additional crop of crystals. Upon recrystallization from hot ethanol (water being added until precipitation starts), the desired product is obtained in the form of plates melting at 178°–179° C. (cor.).

(b) *2,2,4-trimethyl-5-hydroxy-7 - n- amyl -1,2-benzopyran*

This product may be prepared by reacting a solution containing 4.92 grams of 4-methyl-5-hydroxy-7-n-amylcoumarin in 150 cc. of dry dibutyl ether with a solution of methyl magnesium iodide. (The solution containing the Grignard reagent may be prepared in the usual manner by reacting 5.8 grams of magnesium with 34 grams of methyl iodide in 75 cc. of dry ether, adding 50 cc. of dibutyl ether and distilling off the diethyl ether.) The resulting reaction mixture is kept at around 90° C. for about 16 hours after which it is decomposed with dilute hydrochloric acid, the ether layer separated in the usual manner, washed with dilute aqueous sodium bicarbonate and then with water. The residue remaining upon drying and evaporation of the ether is then distilled at 140°–142° C. (0.02 mm.) bath temp. 160°–175° C. The desired product is a reddish viscous oil $n^{20}_D$ 1.5462.

Example II (a) *3-n-butyl-4-methyl-5-hydroxy-7-n-amylcoumarin*

This product may be prepared by reacting a reaction mixture made up of about 4.2 grams of 1,3-dihydroxy-5-n-amylbenzene, 4.9 grams of ethyl n-butylacetoacetate and 7 cc. of phosphorus oxychloride. After standing at room temperature for about 30 hours, the unreacted phosphorus oxychloride is destroyed by the addition of ice to the reaction mixture. About 50 cc. of ether is then added to dissolve the desired product and the ether solution washed with water, aqueous sodium bicarbonate and then with small portions of aqueous sodium hydroxide. Evaporation of the ether solution gives crystals of the desired coumarin which upon recrystallization from ethyl acetate or benzene is obtained as white plates with a melting point of about 140.5–141° C.

(b) *2,2,4-trimethyl-3-n-butyl-5-hydroxy-7-n-amyl-1,2-benzopyran*

This product may be prepared by reacting a solution containing 3.66 grams of 3-n-butyl-4-methyl-5-hydroxy-7-n-amylcoumarin in 70 cc. of dry benzene with a solution of methyl magnesium iodide. (The solution containing the Grignard reagent may be prepared in the usual manner by reacting about 3.53 grams of magnesium with 20.7 grams of methyl iodide in 25 cc. of ether.) After mixing, the ether is distilled off and the benzene solution refluxed for about 10 hours. The excess Grignard reagent is then decomposed by addition of iced dilute hydrochloric acid and the benzene layer separated. After washing with water and aqueous sodium bicarbonate the benzene is then boiled off in the usual manner. The oil remaining is then distilled at about 176°–177° C. (0.05 mm.) bath temp. 190–195° C., and the desired product is obtained as a purplish oil $n^{20}_D$ 1.5375.

Similar to the above examples other products of the present invention may be prepared by reacting the proper 1,3-dihydroxy-5-alkylbenzene with the proper

where R is hydrogen or an alkyl or alkenyl group and R₁ is a lower alkyl group, and then alkylating the resulting coumarin with the desired alkyl magnesium halide or Grignard reagent. For example, a 2,2-dipropyl-3-amyl-4-ethyl-5-hydroxy-7-octyl-1,2-benzopyran product may be prepared by reacting 1,3-dihydroxy-5-octylbenzene with ethyl amylpropionacetate to form the 3-amyl-4-ethyl-5-hydroxy-7-octyl-coumarin, and then reacting this product with propyl magnesium iodide to form the desired benzopyran product.

Another product of particular interest is formed by reacting 1,3-dihydroxy-5-n-hexylbenzene with ethyl methallyl acetoacetate and treating the resulting coumarin with a methyl Grignard reagent. The final product is 2,2,4-trimethyl-3-methallyl-5-hydroxy-7-n-hexyl-1,2-benzopyran and may be represented by the following formula:

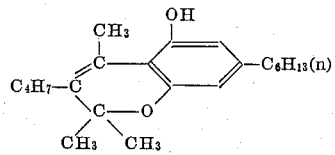

Examples of other products of the present invention include the heptyl, 3-ethyl-amyl, nonyl, decyl, etc., alkyl derivatives as well as the propenyl, pentenyl, etc., unsaturated alkyl or alkenyl hydrocarbon derivatives. It will be understood in this connection that the present invention is not limited to the illustrative examples, as all modifications thereof are intended to be covered by the following claims.

I claim:

1. A compound represented by the following formula

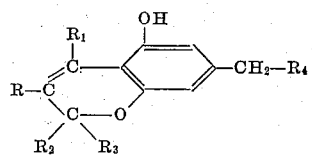

where R is selected from the group consisting of hydrogen, alkyl and alkenyl groups, R₁, R₂ and R₃ represent lower alkyl groups and R₄ represents an alkyl group containing 1 to 10 carbon atoms.

2. 2,2,4-trimethyl-3-alkyl-5-hydroxy-7-R₁-1,2-benzopyran, where R₁ represents an alkyl group containing 2 to 11 carbon atoms.

3. 2,2,4-trimethyl-3-alkenyl-5-hydroxy-7-R₁-1,2-benzopyran, where R₁ represents an alkyl group containing 2 to 11 carbon atoms.

4. A compound represented by the following formula:

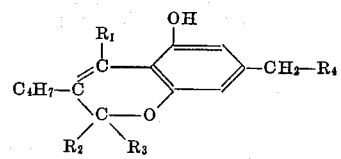

where R₁, R₂ and R₃ represent lower alkyl groups and R₄ represents an alkyl group containing 1 to 10 carbon atoms, and where the C₄H₇ group at the 3-position is selected from the group consisting of straight and branched chain butenyl groups.

5. A compound represented by the following formula:

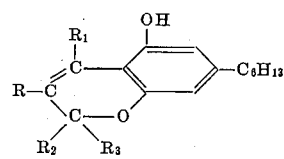

where R represents a member selected from the group consisting of hydrogen, alkyl, and alkenyl groups, and R₁, R₂ and R₃ represent lower alkyl groups, and the C₆H₁₃ group at the 7-position represents a normal hexyl group.

6. The product 2,2,4-trimethyl-3-n-butyl-5-hydroxy-7-n-amyl-1,2-benzopyran.

7. The product 2,2,4-trimethyl-3-methallyl-5-hydroxy-7-n-hexyl-1,2-benzopyran.

8. The process which comprises the following steps (a) reacting a 1,3-dihydroxy-R₄-CH₂-benzene with a substituted acetate product of the formula R₁.C(OH):CRCOO-alkyl, and (b) alkylating the coumarin product resulting from the step (a) by treating said coumarin with a lower alkyl Grignard reagent to form a pyran product represented by the following formula:

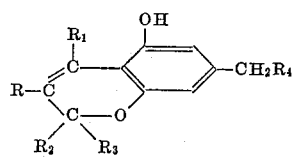

where R is a member selected from the group consisting of hydrogen, alkyl and alkenyl groups, R₁, R₂ and R₃ represent lower alkyl groups and R₄ represents an alkyl group having 1 to 10 carbon atoms.

9. The process of claim 8 in which the coumarin formation in step (a) is carried out in the presence of phosphorus oxychloride.

ROGER ADAMS.